United States Patent [19]

De Shon

[11] Patent Number: 4,683,720
[45] Date of Patent: Aug. 4, 1987

[54] BUOYANCY ENGINE UTILIZING PISTONS AND CRANKSHAFT

[76] Inventor: Dennis A. De Shon, P.O. Box 3255, Baton Rouge, La. 70821

[21] Appl. No.: 858,697

[22] Filed: May 2, 1986

Related U.S. Application Data

[63] Continuation-in-part of Ser. No. 771,363, Aug. 30, 1985, abandoned.

[51] Int. Cl.⁴ ............................................. F03B 17/02
[52] U.S. Cl. ........................................ 60/496; 60/495
[58] Field of Search ................ 60/495, 496; 290/1 R; 417/337

[56] References Cited

U.S. PATENT DOCUMENTS 1,842,661  1/1932  Dell ........................................ 60/496
2,415,124  2/1947  Caminiti ................................ 60/496

Primary Examiner—Stephen F. Husar

[57] ABSTRACT

A buoyancy engine having a plurality of pistons in cylinders is immersed in a vessel of liquid. A crankshaft is rotatably mounted on sealed bearings in the vessels walls. The pistons are attached to the crankshaft by connecting rods. The pistons are designed to hold relatively buoyant compressed air injected into them by computer controlled injectors. When operating, the crankshaft has one or more pistons moving upward due to the buoyancy of the air which they contain, and one or more empty pistons moving downward.

1 Claim, 1 Drawing Figure

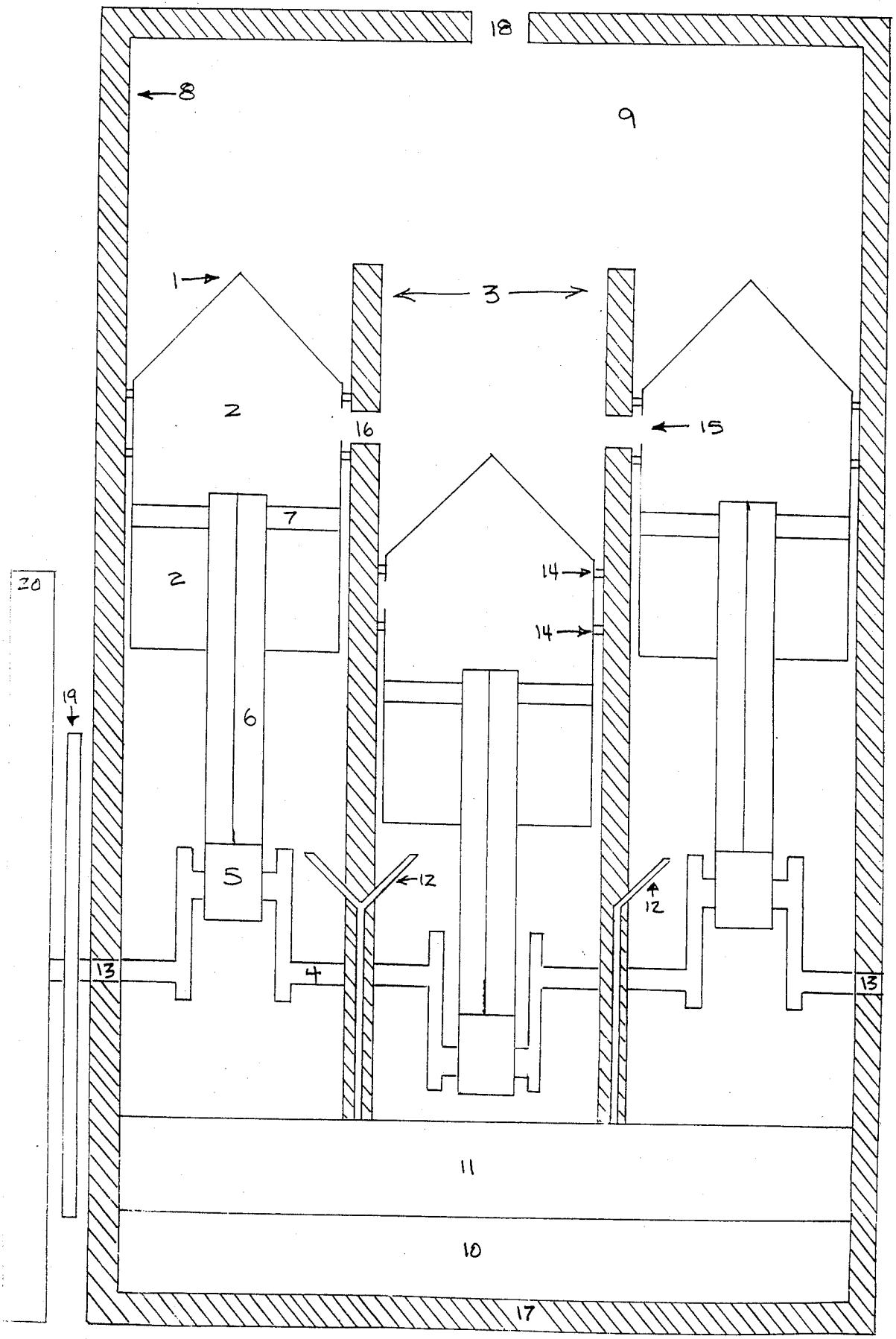

BUOYANCY ENGINE UTILIZING PISTONS AND CRANKSHAFT

This application is a continuation-in-part of Ser. No. 06/771,363 filed 08/30/85, now abandoned.

BACKGROUND OF THE INVENTION

1. Field of the Invention

This invention relates generally to apparatus for producing power and relates more generally to apparatus utilizing the buoyancy of air injected into spaces in pistons contained within cylinders and connected to a crankshaft.

2. Description of the Prior Art

There have been various devices that have been proposed for producing power inexpensively, but these have not proven to be satisfactory.

SUMMARY OF THE INVENTION

The invention comprises a plurality of hydrodynamically designed pistons which incorporate air-containing spaces, and are contained within cylinders, and are connected by connecting rods to a crankshaft which is supported on sealed bearings in the walls of a vessel containing a liquid. Air is compressed by a compressor and injected into the cylinders through computer controlled injectors at a point below each piston as it reaches its lowermost point of travel in the cylinder. The computer is programmed with the cylinder injection sequence, the volume of air to be injected into each cylinder and the rotational speed of the crankshaft resultant from the volume of air programmed for injection. At piston in the injection sequence is manually positioned at its lowermost point of travel in the cylinder. When the program is started, injection of the first cylinder occurs, followed by continuous injection of every cylinder, in injection sequence, as its respective piston reaches its lower most point of travel. The crankshaft is designed with lobes at varying angles to effect a continual rotation, as the plurality of pistons, injected with air, ascend in their respective cylinders due to their relative buoyancy. This imparts a rotary motion to the crankshaft. Each piston incorporates a vent in its design which releases the air contained within the piston, as the piston achieves its uppermost point of travel within the cylinder. This occurs when the piston is positioned in proximity to the air exhaust port in each cylinder.

Attached to the crankshaft is a flywheel which stores some of the mechanical energy produced and provides a continuity to the series of energy developing cycles of the pistons. Additional energy developed by the engine is transmitted through the crankshaft, which produces power by the rotation of the electric generator, or other suitable device, attached to the crankshaft.

OBJECTS AND ADVANTAGES OF THE INVENTION

It is an object of the invention to provide a power unit of this character to produce power over and above that produced for operation of the apparatus.

It is another object of the invention to provide apparatus of this character that is simple in construction and operation.

It is a further object of the invention to provide apparatus of this character that is relatively inexpensive to manufacture and maintain.

The characteristics and advantages of the invention are further sufficiently referred to in connection with the following detailed description of the accompanying drawings, which represent one embodiment.

After considering this example, skilled persons will understand that many variations may be made without departing from the principles disclosed and I contemplate the employment of any structure, arrangements or modes of operation that are properly within the scope of the appended claims.

BRIEF DESCRIPTION OF THE DRAWINGS

Referring to the drawing which is for illustrative purposes only:

The drawing is a schematic view of apparatus embodying the present invention, with the vessel walls cross-sectioned to show the sealed bearings of the crankshaft, and the exhaust ports in the cylinder walls. The pistons are cross sectioned to show the vents, wrist pins and air holding spaces.

DESCRIPTION OF THE PREFERRED EMBODIMENT

Referring more particularly to the drawing, there is shown apparatus embodying the present invention. A plurality of hydrodynamically designed pistons (1), containing air holding spaces (2) are contained within cylinders (3) and are connected to a crankshaft (4) by sealed rod bearings (5) attached to the connecting rods (6). The connecting rods are attached to the pistons by wrist pins (7). The apparatus is immersed in a vessel (8) containing a liquid (9), in this case water, although alternative liquids such as mercury may be used if desired. Air, although other gases may be used, is compressed by a compressor (10) and injected by means of a computer-(11) controlled series of injectors (12) located at points below the pistons. The computer is programmed with the cylinder injection sequence, the volume of air to be injected into each cylinder and the rotational speed of the crankshaft resultant from the volume of air programmed for injection. At initial starting, the first piston in the injection sequence is manually positioned at its lower most point of travel in the cylinder. When the program is started, injection of the first cylinder occurs, followed by continuous injection of every cylinder, in injection sequence, at its respective piston reaches its lower most point of travel. The crankshaft is supported within the vessel on sealed bearings (13). As a piston reaches its lowermost point in the cylinder, air is injected into it, and is contained in it by piston rings (14). The buoyancy of the piston will cause it to ascend until it reaches the uppermost point allowed by the rotation of the crankshaft. At this time, the vent (15) in the piston is postioned adjacent to the exhaust port (16) and the contained air is released through the exhaust port. The lifting stroke of subsequently filled pistons continues to rotate the crankshaft so that pistons, having exhausted their lift-providing air, are again returned to their lowermost positions for air injection to begin their power generating cycle again. The crankshaft is designed so that the air injection, and the subsequent lifting strokes of the pistons are staggered in relation to one another, so that their power strokes are developed successively, thus producing continuous power. The vessel sits on a base (17) and has an orifice (18) through which air, having exited the pistons, can exit the vessel. Attached to the crankshaft is a flywheel (19) which stores some of the mechanical energy produced and provides a continuity to the series of energy developing cycles of the pistons. Additional energy developed by the engine is transmitted through the crankshaft, producing power by the rotation of the electric generator (20). The crankshaft may be connected to other devices or apparatus, should it be so desired.

The invention and its attendant advantages will be understood from the foregoing description and it will be apparent that various changes may be made in the form, construction and arrangement of the parts without departing from the spirit or scope thereof or sacrificing its material advantages, the arrangement hereinbefore being merely by way of example; and I do not wish to be restricted to the specific form shown or uses mentioned except as defined in the accompanying claims.

I claim:

1. A buoyancy engine utilizing pistons and crankshaft, comprising:
   a plurality of cylinders, disposed in a vessel contained liquid;
   said vessel sitting on a base and having an air exhaust orifice at its top;
   a plurality of hydrodynamically designed pistons, disposed within said cylinders, designed with air holding spaces to hold injected air, and attached by connecting rods to a hydrodynamically designed crankshaft;
   sealed connecting rod bearings which connect the piston rods to the crankshaft;
   wrist pins which connect the piston rods to the pistons;
   said crankshaft supported on sealed bearings in the vessel walls, and which is rotated by the upward motion of the relatively buoyant pistons which are attached;
   said crankshaft designed so that its lobes to which the pistons are attached are at angles which insure that power developed by pistons in their lift cycle is successively converted into continuing rotational force on the crankshaft;
   computer-controlled air injectors, programmed to crankshaft rotational speed, positioned to inject air, compressed by a compressor, into the pistons at the bottom of each piston's stroke;
   said pistons having pistons rings to retain the air in the piston during its upward power stroke;
   said pistons having vents incorporated into their design for the release of air at the top of their power stroke;
   an exhaust port in each cylinder which conducts air released from pistons to be released into the ambient liquid;
   a flywheel attached to the crankshaft, which stores a part of the mechanical energy produced, and which provides continuity to the series of energy developing cycles of the pistons;
   a generator attached to the crankshaft, which produces electric power from the rotation of the crankshaft.

* * * * *